(12) United States Patent
Gierak (10) Patent No.: US 12,270,388 B2
(45) Date of Patent: Apr. 8, 2025

(54) METHOD FOR CONTROLLING AN ION THRUSTER, AND ION THRUSTER SYSTEM

(71) Applicant: CENTRE NATIONAL DE LA RECHERCHE SCIENTIFIQUE, Paris (FR)

(72) Inventor: Jacques Gierak, Le Plessis-Pate (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 332 days.

(21) Appl. No.: 17/593,301

(22) PCT Filed: Mar. 16, 2020

(86) PCT No.: PCT/EP2020/057109
§ 371 (c)(1),
(2) Date: Sep. 15, 2021

(87) PCT Pub. No.: WO2020/187835
PCT Pub. Date: Sep. 24, 2020

(65) Prior Publication Data
US 2022/0205437 A1 Jun. 30, 2022

(30) Foreign Application Priority Data
Mar. 18, 2019 (FR) ...................................... 1902767

(51) Int. Cl.
*F03H 1/00* (2006.01)
*B64G 1/40* (2006.01)

(52) U.S. Cl.
CPC ............. *F03H 1/005* (2013.01); *B64G 1/405* (2013.01); *F03H 1/0018* (2013.01)

(58) Field of Classification Search
None
See application file for complete search history.

(56) References Cited

U.S. PATENT DOCUMENTS

| 2003/0066969 A1 | 4/2003 | Fernandez |
| 2004/0094725 A1 | 5/2004 | Gierak et al. |
| 2010/0251690 A1 | 10/2010 | Kueneman et al. |

OTHER PUBLICATIONS

Marcuccio "Ionic liquid FEEP thruster ion beam characterization" (Year: 2013).*

(Continued)

*Primary Examiner* — David P. Olynick
(74) *Attorney, Agent, or Firm* — Greer, Burns & Crain, Ltd (57) ABSTRACT

A method for controlling an ion thruster including an emission electrode, an extraction electrode and a conductive liquid which is deposited on the emission electrode, the ion thruster configured for emitting an ion beam when an electric field is applied to the conductive liquid, the ion beam providing thrust to the thruster, the thrust depending on an emission current $I_{em}$ and an ion emission speed, the method including the following steps: adjusting the emission current to a setpoint value $I_c$ by applying a threshold emission potential $V_{thresh}$ to the emission electrode by means of a current generator; and when the setpoint value $I_c$ of the emission current is reached, adjusting the emission speed by applying an extraction potential $V_{ext}$ to the extraction electrode by means of a voltage generator in order to bring the emission potential $V_{em}$ to a predetermined value $V_{empr}=V_{thresh}+V_{ext}$.

13 Claims, 4 Drawing Sheets

(56) References Cited

OTHER PUBLICATIONS

French Search Report received for Application No. 1902767, dated Jan. 31, 2020.
International Search Report and Written Opinion for PCT/EP2020/057109, mailed Jun. 16, 2020.
Ceruti, L., et al., "Power Processing Control Units for Feep Micro-Propulsion Subsystems," Proceedings of the 8th European Space Power Conference, 2008, Constance, Germany, 8 pages.
Dandavino, S., et al., "Microfabricated electrospray emitter arrays with integrated extractor and accelerator electrodes for the propulsion of small spacecraft," J. Micromech. Microeng., vol. 24, No. 7, 2014, 13 pages.
Hill, F., et al., "High-Throughput Iconic Liquid Ion Sources using Arrays of Microfabricated Eletrospray Emitters With Integrated Extractor Grid and Carbon Nanotube Flow Control Structures," Journal of Microelectromechanical Systems, IEEE Service Center, vol. 23, No. 5, 2014, pp. 1237-1248.
Lozano, P., "Less in Space," American Scientist, vol. 104, 2016, 6 pages.
Vasiljevich, M., et al., "Development of an Indium mN-FEEP Thruster," 44th AIAA/ASME/SAE/ASEE Joint Propulsion Conference & Exhibit, Jul. 2008, Hartford, CT, 9 pages.
Communication received for European Application No. 20710182.5, dated Mar. 12, 2024.
Scharlemann, C., et al., "Qualification test series of the indium needle FEEP micro-propulsion system for Lisa Pathfinder," Acta Astronautica 69, 2011, pp. 822-832.

* cited by examiner

METHOD FOR CONTROLLING AN ION THRUSTER, AND ION THRUSTER SYSTEM

BACKGROUND

The present invention relates to a method for controlling an ion thruster. It also relates to an ion thruster system implementing a method of this kind.

The field of the invention is, non-limitatively, that of spacecraft propulsion.

For spacecraft such as satellites, various propulsion technologies are known, such as chemical propulsion, cold gas propulsion or electric propulsion.

Miniaturized satellites, such as CubeSats, are being increasingly used for transmitting information and exploring space.

Unlike conventional satellites, with miniaturized satellites it is possible to considerably reduce the cost associated with deploying them. These satellites are also advantageous in that they have better manoeuvrability.

Appropriate propulsion and control systems are necessary for these small satellites. However, the known propulsion technologies have the drawback whereby they cannot be easily adapted to small satellites, for technical or efficiency reasons. For example, the exhaust velocity of said chemical thrusters is limited by the inherent specific energy released by combustion. Moreover, the fuel tanks and power supply systems for chemical thrusters, or those based on ionized gases, are large and heavy, making them incompatible with the propulsion of miniaturized satellites and small spacecraft.

Thrusters based on electrosprays, referred to as ion thrusters, have been proposed. Electrospray technology is a type of electric propulsion that generates thrust from an ionic liquid by ejecting and accelerating ions in an electrostatic field of the order of a billion volts per metre. An example is that of the thrusters that use field-emission electric propulsion. Specifically, this type of thruster is suitable for applications that require thrust values in the range of micro-Newtons to several milli-Newtons to control the orientation and position of spacecraft weighing between 1 kg and 300 kg.

Ion thrusters are composed substantially of an emission electrode, which comprises a set of emitters, an extraction electrode, a propellant tank and, in some cases, an acceleration electrode.

An example of a system of this kind is described in P. C. Lozano "*Less in Space*", American Scientist, Volume 104, page 270 (2016). The emission electrode has a plurality of aligned emitters in the form of porous tips infused with ionic liquid, as well as an extraction electrode and an acceleration electrode, the respective openings in which are aligned with the tips.

Another example of an ion thruster system is described in S. Dandavino et al., "*Microfabricated electrospray emitter arrays with integrated extractor and accelerator electrodes for the propulsion of small spacecraft*", J. Micromech. Microeng., 24, 075011 (2014), in which the emitters comprise a capillary microtube for supplying the propellant liquid to the end thereof, from where the propellant liquid is ionized.

Another example of an ion thruster system is described in I. Vasiljevich et al., "*Development of an Indium mN-FEEP Thruster*", 44th AIAA/ASME/SAE/ASEE Joint Propulsion Conference & Exhibit, 21-23 Jul. 2008, Hartford, CT, in which a liquid indium film brought to its melting point by heating diffuses in a set of microporous structures, from where it is ionized by applying an electric field.

A potential difference of the order of 1-10 kV is applied to generate a strong local electric field at the tip of the emitter. This electric field deforms the liquid-propellant film into a conical structure referred to as a Taylor cone, located at the tip of the emitter, and extracts charged particles at the apex of the cone. The charged particles are then accelerated at high speeds of the order of several tens of kilometres per second by the applied electric field.

The thrust of an ion thruster depends on the flux, or emission current, and on the speed of the ions ejected thereby. For a thruster of this kind to function effectively, the flux and the speed of the ejected ions must be controlled.

SUMMARY

An aim of the present invention is to propose a method for controlling an ion thruster that allows the speed of the ejected ions to be controlled independently of the emission current.

Another aim of the present invention is to propose a method for controlling an ion thruster that allows the thrust of the thruster to be controlled independently of the polarity of the emitted ions.

A further aim of the present invention is to propose a method for controlling an ion thruster that allows for prolonged operation without any depletion of the emitted ionic species and thus without any build-up of counterions in the thruster.

Yet another aim of the present invention is to propose a method for controlling an ion thruster that has high efficiency and is suitable for use in nano-satellites (around 1 kg-50 kg) and micro-satellites (around 50 kg-300 kg).

At least one of these aims is achieved with a method for controlling an ion thruster, the ion thruster comprising an emission electrode, an extraction electrode and a conductive liquid deposited on the emission electrode, the ion thruster being suitable for emitting an ion beam when an electric field is applied to the conductive liquid, the ion beam being suitable for providing the thruster with thrust, the thrust depending on an emission current $I_{em}$ and an ion emission speed, characterized in that the method comprises the following steps:

- adjusting the emission current to a setpoint $I_c$ by applying a threshold emission potential $V_{thresh}$ to the emission electrode by means of a current generator; and
- when the setpoint $I_c$ of the emission current is reached, adjusting the emission speed by applying an extraction potential $V_{ext}$ to the extraction electrode by means of a voltage generator, so as to bring the emission potential $V_{em}$ to a predetermined value $V_{em}=V_{thresh}+V_{ext}$.

The thrust of the thruster is expressed in Newtons and defined as follows:

$$T[N] = \sqrt{2\frac{1}{\left(\frac{q}{m}\right)}} I_{em} \times \sqrt{V_{em}}, \quad \text{[Equation 1]}$$

where q is the charge of the ejected particle, m is its weight, $I_{em}$ is the ejected current or flux, and $V_{em}$ is the potential of the emitter, respectively.

The method for controlling an ion thruster according to the invention proposes a step of adjusting the emission current, corresponding to a phase of activation of the thruster, and a step of adjusting the emission speed, corresponding to a phase of increasing the speed of the ejected ions.

During the activation phase, the ejection of ions is initiated by applying an emission potential to the emission electrode by means of a current source. In this way, a local electric field of the order of, for example, $10^9$ V/m, as required for ejecting ions by field evaporation, is created at the emission electrode. The flux, or the number of ions ejected, is determined by a setpoint of the emission current, this value being delivered and adjusted by the current source. The setpoint of the emission current is reached with a threshold emission potential. The current source is, for example, constituted by a high-voltage power supply operated in "current-source" mode, suitable for quickly delivering the desired ion flow.

During the phase of increasing the speed of the ions, the speed, and thus the energy, of the ejected ions is selected by bringing the extraction electrode to an extraction potential by means of a voltage source. By adjusting the extraction potential, it is thus possible to select, set and maintain the speed, and thus the beam potential of the ions, at a desired level. In this case, the term "beam potential" refers to the resultant potential between the emission and extraction potentials applied to the emission and extraction electrodes, respectively.

When the threshold value of the emission potential changes, the beam potential may thus be set to maintain the proper functioning of the thruster over long periods. For example, the threshold value may increase due to the depletion of species in the conductive liquid and, simultaneously, a build-up of counterions, which will affect the mobility of the ionic species of interest. It is therefore possible to monitor the degradation of the conductive liquid by observing the change in the threshold value of the emission potential or the value of the set beam potential. In addition, it is possible to take countermeasures, in an automated manner, so as not to exceed a critical depletion threshold for the emitted ionic species and for the corollary, i.e. the build-up of counterions, and thus to protect the thruster from chemical reactions that have a degrading effect due to these interlinked, cumulative build-up and depletion mechanisms.

Owing to the control method according to the invention, the emission and acceleration of the ions are controlled independently of one another, allowing the ion thruster to be used more effectively and for longer. Moreover, the control method according to the invention allows ions to be ejected and accelerated regardless of their polarity.

Preferably, the step of adjusting the emission current may be implemented by gradually increasing the value of the potential applied to the emission electrode from 0 to the threshold value $V_{thresh}$ for which the emission current $I_{em}$ reaches the setpoint $I_c$.

According to another embodiment of the invention, the step of adjusting the emission speed may be implemented by one of the following steps:
  applying a potential of 0 V,
  applying a potential having the same sign as the emission potential, or
  applying a potential having the opposite sign to the emission potential.

Where an extraction potential $V_{ext}$ has the same sign as the emission potential $V_{em}$, it is possible to increase, set and maintain the beam potential at a value at which the propulsion efficiency of the thruster is at its maximum, while remaining within the limits of the value of the available potentials, for example on board a satellite.

Where an extraction potential $V_{ext}$ has the opposite sign to that of the emission potential $V_{em}$, it is possible to reduce, set and maintain the beam potential at a potential value that is available for the thruster. For example, if the threshold potential is 7 kV, while the value of the maximum available potential is only 5 kV, it is possible, by applying −2 kV to the extraction electrode, to obtain an emission of ions of a beam potential of 5 kV and thus to remain within the range of the available voltages.

Where the extraction potential is 0 V, the emission of ions is achieved for the threshold potential applied to the emission electrode.

According to an example, the step of adjusting the emission current may comprise a step of automatically controlling the setpoint $I_c$ of the emission current.

To do so, the emitted current may be measured at the extraction electrode, or by a device for measuring the intensity of the delivered electrical current, placed in the current generator and automatically controlled through comparison with the requested setpoint. With this automatic-control step, it is possible to control the setpoint current automatically.

According to an embodiment of the invention, the step of adjusting the emission current may further comprise a step of setting the emission current.

According to an example, setting the emission current may be implemented by setting the potential applied to the emission electrode $V_{em}$.

To do so, the setpoint of the emission current may be varied slightly around the original setpoint $I_c$. By this setting step, it is possible to control very finely the flux of ions, and thus the mass ejected by the emission electrode.

According to an embodiment of the invention that is in no way limitative, the step of adjusting the emission speed may further comprise a step of setting the emission speed.

For example, the step of setting the emission speed may be implemented by adjusting the potential applied to the extraction electrode $V_{ext}$.

In particular, this step makes it possible to revert to a desired emission speed after an adjustment of the flux, which might have changed the emission speed.

With the steps of setting the emission current and/or the emission speed, it is possible to control the thrust of the thruster very finely.

According to an embodiment that is in no way limitative, the method of the invention may further comprise a step of stopping the ion thruster. The stopping step may comprise the following steps:
  gradually reducing the value of the extraction potential $V_{ext}$ so as to obtain $V_{ext}=0$ and $V_{em}=V_{thresh}$,
  gradually reducing the value of the emission potential $V_{em}$ so as to obtain $V_{em}=0$.

Advantageously, the method according to the invention may comprise an iteration of the steps of adjusting and setting the emission current, adjusting and setting the emission speed, and the stopping step, the polarities of the emission potential $V_{em}$, and of the extraction potential being inverted in each new repetition cycle compared with the previous cycle.

By regularly changing the ion polarity, the method according to the invention in particular makes it possible to extend the service life of the conductive liquid of the thruster by slowing down the depletion of chemical species and, simultaneously, the build-up of counterions. This reduces the necessary weight and volume of the conductive liquid.

According to another aspect of the same invention, an ion thruster system is proposed, comprising an ion thruster which comprises an emission electrode, an extraction electrode and a conductive liquid deposited on the emission electrode, the system further comprising a current generator connected to the emission electrode, and a voltage generator connected to the extraction electrode, the system being suitable for carrying out the method according to the invention.

The conductive liquid may comprise an ionic liquid or a metal liquid, i.e. a liquid made to be conductive, or a liquid or molten metal.

The liquid metal ion sources (LMIS) can, for example, include gallium, indium, gold and alkali metals or alloys.

The ionic liquids may include, for example, salts of large organic anions and cations. The cations may include, for example, phosphate, ammonium or sulphate salts. The anions may include, for example, chlorine, bromine, tetrafluoroborate, hexafluorophosphate, etc.

Advantageously, the system according to the invention may be implemented in a satellite, in particular of the CubeSat type.

The system and method according to the invention are particularly suitable for controlling the orientation and position of small satellites.

BRIEF DESCRIPTION OF THE DRAWINGS

Other advantages and characteristics will become apparent on examination of the detailed description of examples that are in no way limitative, and from the attached drawings, in which.

DETAILED DESCRIPTION

It is well understood that the embodiments which will be described hereinafter are in no way limitative. It is possible in particular to envisage variants of the invention comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, the elements common to several figures retain the same reference.

Figure 1:
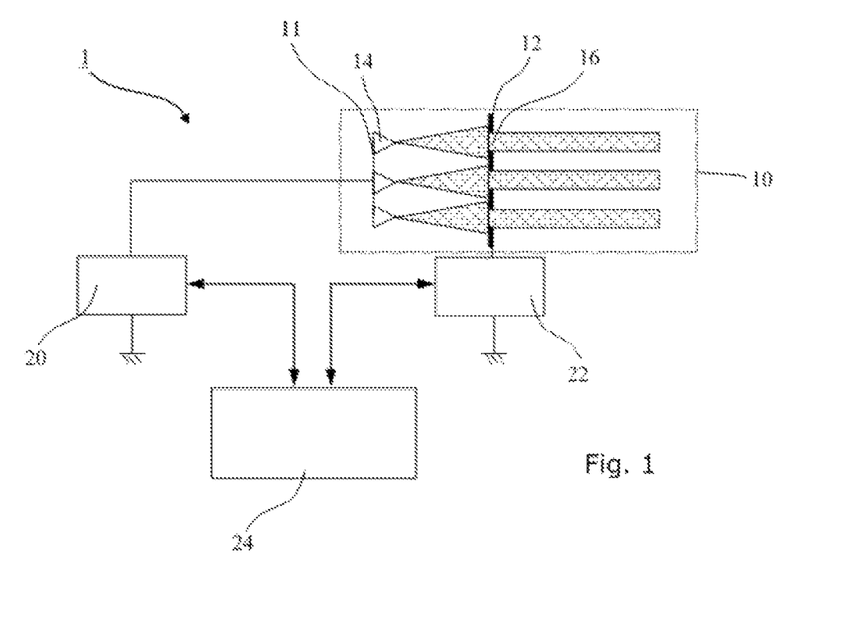
FIG. 1 is a diagrammatic representation of a non-limitative embodiment of a propulsion system implemented in the present invention.

FIG. 1 is a diagrammatic representation of a non-limitative embodiment of an ion thruster system that may be implemented within the framework of the present invention. The system may in particular be used to carry out the method of the invention.

The system 1 shown in FIG. 1 is arranged so as to produce an ion beam suitable for providing the system 1 with ion thrust.

The system 1 comprises an ion thruster 10, comprising an emission electrode 11 and an extraction electrode 12.

The emission electrode 11 comprises a plurality of emitters 14, for example in the form of tips. The emitters 14 are covered by a conductive liquid. This conductive liquid may be, for example, an ionic liquid, a liquid made to be conductive, or a liquid or molten metal. When an electric field is generated between the two electrodes 11, 12, a very strong local electric field (of the order of $10^9$ V/m) is generated at the tips, which causes the conductive liquid to form a Taylor cone located at a plurality of tips 14 of the emission electrode 10. Ions are then emitted at the apex of each cone. The charged particles are then accelerated at high speeds of the order of several tens of kilometres per second by the applied electric field.

By way of example, the extraction electrode 12 may consist of a metal plate that is arranged opposite the emission electrode 11 and has openings 16 for allowing the flux of ions to pass through.

The ion beam generated by the thruster 10 provides a thrust thereto. The thrust depends on an emission current $I_{em}$ and on the potential applied to the emitter, corresponding to an ion emission speed.

The system 1 shown in FIG. 1 likewise comprises a first high-voltage power supply 20 for powering the emission electrode 11, and a second high-voltage power supply 22 for powering the extraction electrode 12.

The first power supply 20 is a high-voltage generator operating in current-source mode. This means that the generator 20 is suitable for delivering a constant current corresponding to a setpoint, and of minimizing the variations thereof.

The second power supply 22 is a high-voltage generator operating in voltage-source mode. This means that the generator 22 is suitable for delivering a stable output voltage and of minimizing the variations thereof.

As shown in FIG. 1, the first power supply 20 and the second power supply 22 are independent of one another, each of the two being directly earthed.

Lastly, the system 1 comprises a controller 24 connected to the high-voltage power supplies 20, 22, for controlling the power supplies 20, 22, for example in accordance with a method for controlling the thruster within the framework of the present invention.

Figure 2:
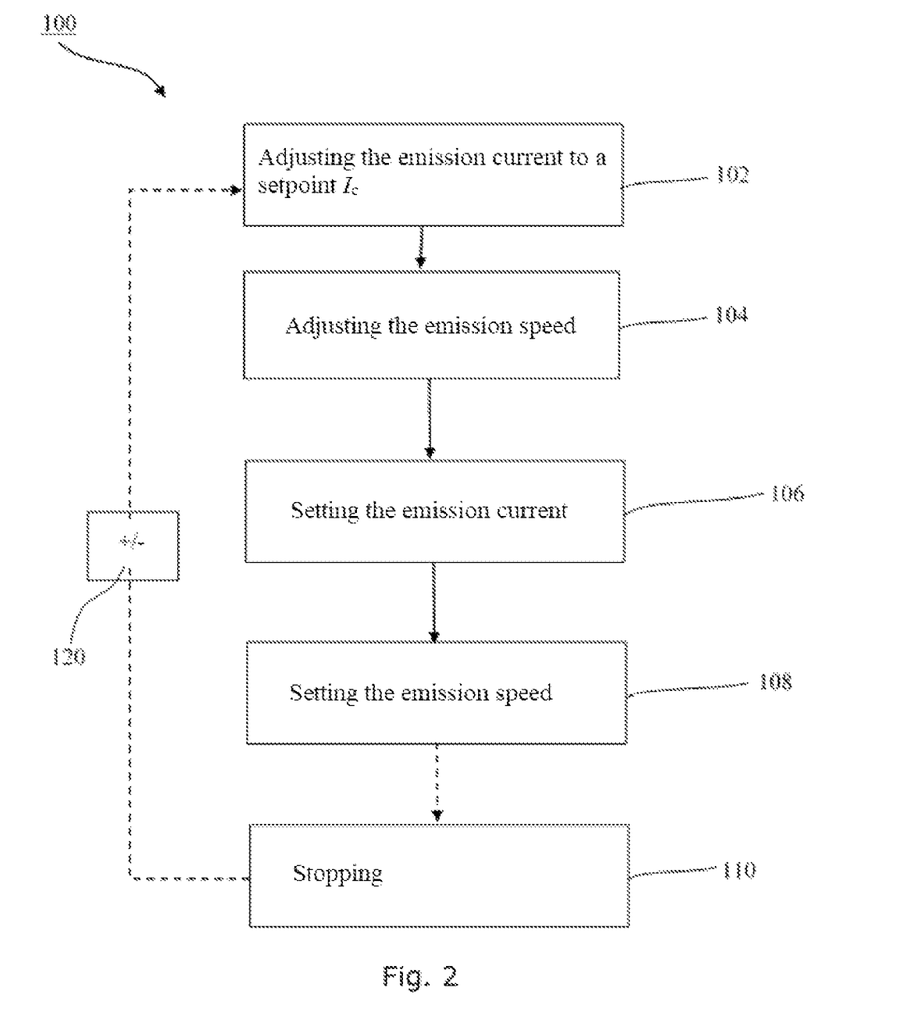
FIG. 2 is a diagrammatic representation of a non-limitative example of a method for controlling a thruster according to the present invention.

FIG. 2 is a diagrammatic representation of a non-limitative embodiment of a method for controlling an ion thruster according to the invention.

The method 100 shown in FIG. 2 comprises a step 102 of adjusting the emission current to a setpoint $I_c$. The emission current corresponds to the fluxes of ions emitted by the emitters 14. The setpoint may be, for example, 50 µA.

The emission current is adjusted by applying a threshold emission voltage $V_{thresh}$ to the emission electrode 11 by means of the current generator 20. Owing to the current generator 20, the current of ions emitted can be precisely controlled. The value of the setpoint current $I_c$ is kept constant. To do so, the system 1 according to the invention may comprise a device for measuring the emission current in order to automatically control said current value. The measurement device may comprise, for example, a microammeter placed in the current generator 20, or an ammeter placed at the extraction electrode 12.

The initial conditions for carrying out the step 102 of adjusting the emission current are the following: voltage applied to the emission electrode $V_{em}=0$ and voltage applied to the extraction electrode $V_{ext}=0$. The voltage $V_{em}$ applied to the emission electrode 11 is then increased gradually, for example in 500 V steps. $V_{em}$ is increased until the current emitted by the current generator 20 reaches its setpoint $I_c$. To keep the setpoint $I_c$ constant, the value of $V_{em}$ is set automatically owing to the automatic control of the emission current.

The value of $V_{em}$ corresponds to the threshold value $V_{thresh}$ of the potential for which emission of ions is achieved, this value being characteristic of the ion thruster 10. This value may be, for example, 5,000 V.

At the end of the step 102 of adjusting the emission current, the thruster 10 emits a flux of ions that corresponds to a certain mass of ejected matter but the emission speed of which is not yet nominal, or optimal, in relation to a requested thrust T value.

Figure 3:
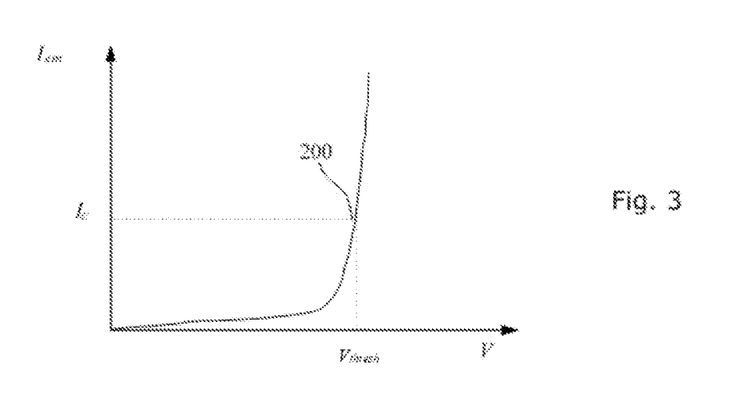
FIG. 3 shows a characteristic curve of a thruster for a step of the method according to the present invention.

FIG. 3 shows a characteristic curve of the emission current $I_{em}$ plotted against the beam potential V applied between the electrodes 11, 12 of the thruster 10. The setpoint $I_c$ of the current is reached for the voltage $V_{thresh}$ applied to the emission electrode, with no voltage applied to the extraction electrode, and this defines a working point 200 of the thruster.

During a step 104 of controlling the emission speed in the method 100 according to the embodiment of FIG. 2, an extraction voltage $V_{ext}$ is applied to the extraction electrode 12 by means of the voltage generator 22. The emission potential between the electrodes 11, 12 is thus brought to a programmed value $V_{empr}$ such that $V_{empr}=V_{thresh}+V_{ext}$.

The programmed potential $V_{empr}$ corresponds to a predetermined beam potential for which the thrust reaches a requested value. The value $V_{empr}$ may be predetermined, for example, by calculations by the on-board controller 24, or by a remote control centre, and sent to the controller 24.

The initial conditions for carrying out the step 104 of adjusting the emission speed are the following: voltage applied to the emission electrode $V_{em}=V_{thresh}$ and voltage applied to the extraction electrode $V_{ext}=0$. According to an embodiment, the voltage $V_{ext}$ applied to the extraction electrode 12 is then increased gradually, for example in 50 V steps. The sign of the voltage $V_{ext}$ is the same as that of the voltage $V_{thresh}$. The increase of the value of the voltage $V_{ext}$ at the extraction electrode is governed by an asymptotic-type law that is variable over time, thus making it possible to avoid electrical discharge or breakdown phenomena. $V_{ext}$ is increased until the emission potential reaches the programmed value $V_{empr}$.

Figure 4:
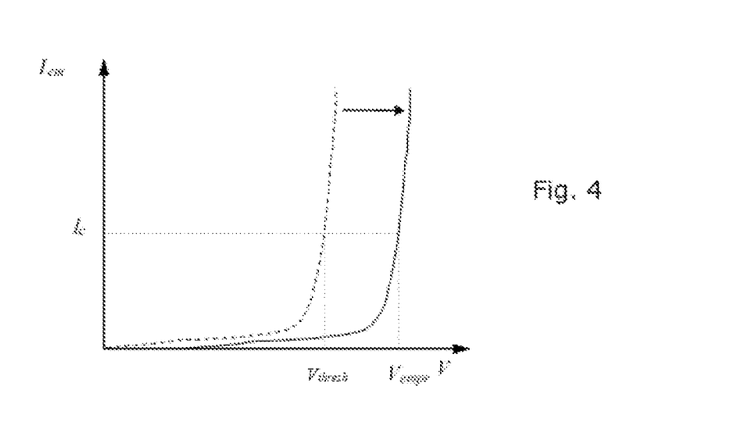
FIG. 4 shows a characteristic curve of a thruster for another step of the method according to the present invention.

FIG. 4 shows the shift of the characteristic curve $I_{em}(V)$ for the step 104 of controlling the emission speed. In this example, the value of V is increased from $V_{thresh}$ to $V_{empr}$ by applying the extraction voltage $V_{ext}$ to the extraction electrode, and the value of the emission current remains at the setpoint $I_c$.

According to other embodiments, the voltage $V_{ext}$ may be 0, or even have the opposite sign to that of the emission voltage $V_{em}$.

At the end of the step 104 of adjusting the emission speed, the value of the emission current still corresponds to the setpoint $I_c$.

The method 100 according to the embodiment shown in FIG. 2 further comprises a step 106 of setting the emission current. This step 106 makes it possible to adjust and control the thrust of the thruster 10 by acting on the flux of ions and thus on the ejected mass.

Figure 5:
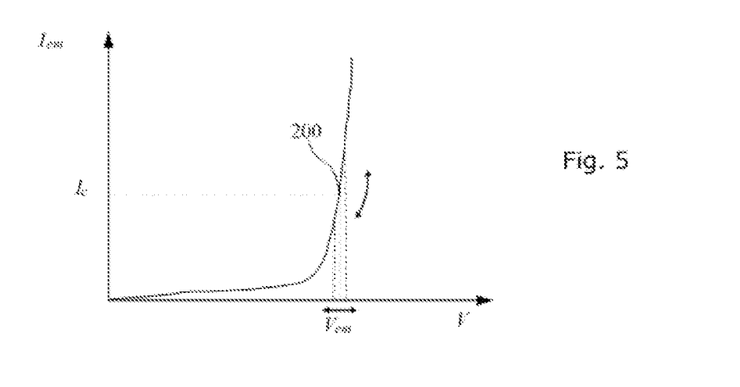
FIG. 5 shows a characteristic curve of a thruster for another step of the method according to the present invention.

During this step 106, the emission current may be reduced or increased by changing the setpoint of said current sent to the current generator 20. The effect of this step is shown in FIG. 5. A small variation in the voltage $V_{em}$ applied to the emission electrode may significantly change the emission current, thus allowing the flux of ions to be set very finely.

FIG. 5 shows the shift of the working point 200 on the characteristic curve $I_{em}(V)$ for the step 106 of setting the emission current while the emission voltage $V_{em}$ is varied.

The method 100 according to the embodiment shown in FIG. 2 further comprises a step 108 of setting the emission speed. By means of this step 108, the emission speed may be finely adjusted and maintained in order to obtain the thrust requested from the thruster. Indeed, during the step 106 of setting the emission current, the emission potential may no longer correspond to the predetermined emission potential $V_{empr}$.

Figure 6:
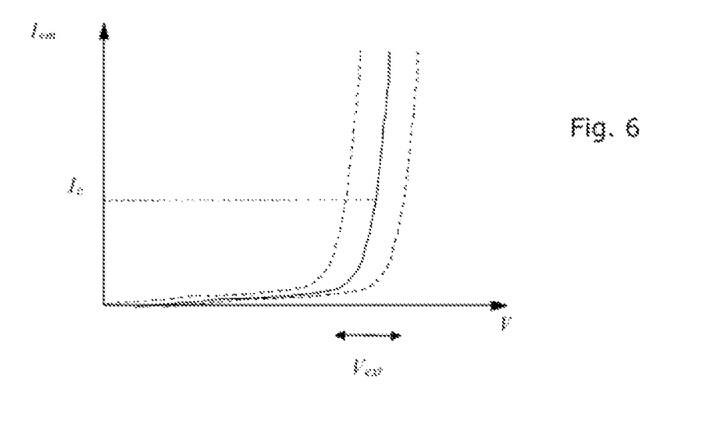
FIG. 6 shows a characteristic curve of a thruster for another step of the method according to the present invention.

During the step 108, setting may be implemented by varying the extraction voltage $V_{ext}$, as shown in FIG. 6. The emission potential is given by the sum of the voltages applied to the electrodes, $V_{em}=V_{thresh}+V_{ext}$. The threshold emission potential $V_{thresh}$ is a physical characteristic given by the geometry of the emitter and may be distorted by various ageing mechanisms that affect, for example, the morphology of the emitter or even the physico-chemical characteristics of the conductive liquid used as the propellant. It is then possible to revert the emission potential to the desired value $V_{empr}$ by varying the extraction voltage $V_{ext}$.

Due to this step 108 of setting the emission speed, therefore, it is likewise possible to compensate for depletion of the ionic species of interest present in the conductive liquid, making it necessary to provide more energy in order to extract this depleted species and leading to an increase in the threshold value of the emission potential.

FIG. 6 shows the shift of the characteristic curve $I_{em}(V)$ for the step 108 of setting the emission speed, which is implemented by varying the value of the extraction voltage $V_{ext}$.

Owing to the setting amplitudes of the emission and extraction voltages, it is possible to maintain the thruster in operation for long periods because the depletion of the emitted ionic species is compensated for.

According to an advantageous embodiment of the invention, the method 100 comprises a phase 110 of stopping the thruster. During the stopping phase 110, the power supply to the electrodes, and thus the emission of the ion beam are stopped.

According to an embodiment example, to carry out this stopping phase 110, the value of the extraction voltage $V_{ext}$ applied to the extraction electrode 12 is reduced gradually to 0, so as to revert to an emission potential of $V_{em}=V_{thresh}$. When $V_{ext}=0$, the value of the emission voltage $V_{em}$ applied to the emission electrode 11 is reduced gradually to 0.

Of course, other ways of carrying out the stopping phase may be applied.

By implementing the stopping phase 110, it is possible in particular to restart the thruster with the opposite polarity, as a result of which ions having the opposite polarity to those of the previous operating cycle of the thruster can be used. The depletion of a species in the conductive liquid is thus greatly slowed down. The restarting of the thruster with the opposite polarity after stopping is indicated by the reference 120 in FIG. 2. The thruster may be restarted by inverting the polarities of the emission and extraction voltages in relation to those used during the previous cycle.

To be able to use the thruster for a longer period, it is thus possible to perform an iteration of the steps of adjusting and setting the emission current, adjusting and setting the emission speed and the stopping step, the polarities of the emission potential $V_{em}$ and of the extraction potential $V_{ext}$ being inverted in each new repetition cycle compared with the previous cycle.

Of course, the invention is not limited to the examples which have just been described and numerous adjustments can be made to these examples without exceeding the scope of the invention.

The invention claimed is:

1. A method for controlling an ion thruster, the ion thruster comprising an emission electrode, an extraction electrode and a conductive liquid deposited on the emission electrode, the ion thruster being suitable for emitting an ion beam when an electric field is applied to the conductive liquid, the ion beam being suitable for providing the ion thruster with thrust, the thrust depending on an emission current and an ion emission speed, the method includes the following steps:

delivering the emission current and adjusting the emission current to a setpoint Ic by means of a current generator wherein a number of ions ejected is determined by the setpoint of the emission current;

when the setpoint $I_c$ of the emission current is reached, adjusting the emission speed by applying an extraction potential $V_{ext}$ to the extraction electrode by means of a voltage generator, so as to bring the emission potential Vem to a predetermined value $V_{emnpr}=V_{thresh}+V_{ext}$, wherein $V_{thresh}$ is the threshold value of the potential applied to the emission electrode for which the emission current $I_{em}$ reaches the setpoint $I_c$ wherein the current generator and the voltage generator are independent of one another and are each coupled to a controller; and controlling, via the controller, 1) the current generator, to adjust the setpoint I, and the number of ions ejected and 2) the voltage generator, to adjust the extraction potential and the emission speed, to provide a thrust of the ion thruster.

2. The method according to claim 1, characterized in that the step of adjusting the emission current is implemented by gradually increasing the value of the emission potential applied to the emission electrode from 0 to the threshold value $V_{thresh}$ for which the emission current $I_{em}$ reaches the setpoint $I_c$.

3. The method according to claim 1, characterized in that the step of adjusting the emission speed is implemented by one of the following steps:

applying a potential of 0 V, applying a potential having the same sign as the emission potential or applying a potential having the opposite sign relative to that of the emission potential.

4. The method according to claim 1, characterized in that the step of adjusting the emission current may comprise a step of automatically controlling the setpoint $I_c$ of the emission current.

5. The method according to claim 1, characterized in that the step of adjusting the emission current further comprises a step of setting the emission current.

6. The method according to claim 5, characterized in that setting the emission current is implemented by setting the potential applied to the emission electrode $V_{em}$.

7. The method according to claim 1, characterized in that the step of adjusting the emission speed further comprises a step of setting the emission speed.

8. The method according to claim 7, characterized in that the emission speed is set by adjusting the extraction potential $V_{ext}$.

9. The method according to claim 1, characterized in that it further comprises a step of stopping the ion thruster, the stopping step comprising the following steps:

gradually reducing the value of the extraction potential $V_{ext}$ so as to obtain $V_{ext}=0$ and $V_{em}=V_{thresh}$; and gradually reducing the value of the emission potential $V_{em}$ so as to obtain $V_{em}=0$.

10. The method according to claim 9, characterized in that it comprises an iteration of the steps of adjusting and setting the emission current including setting the emission current, adjusting and setting the emission speed including setting the emission speed, and the stopping step, the polarities of the emission potential $V_{em}$ and of the extraction potential being inverted in each new repetition cycle compared with a previous cycle.

11. An ion thruster system comprising:

an ion thruster which includes an emission electrode, an extraction electrode and a conductive liquid deposited on the emission electrode;

the system further comprising a current generator connected to the emission electrode; a voltage generator connected to the extraction electrode and a controller coupled to the current generator and the voltage generator;

wherein the current generator and the voltage generator are independent of one another, the system being suitable for carrying out the method according to claim 1.

12. The system according to claim 11, characterized in that the conductive liquid comprises one from an ionic liquid, a liquid made to be conductive, and a liquid or molten metal.

13. A satellite of the CubeSat type, comprising the ion thruster system according to claim 11.

* * * * *